April 10, 1934.  G. C. SUPPLEE ET AL  1,954,602
PROCESS OF PRODUCING BETA LACTOSE
Filed Jan. 11, 1934
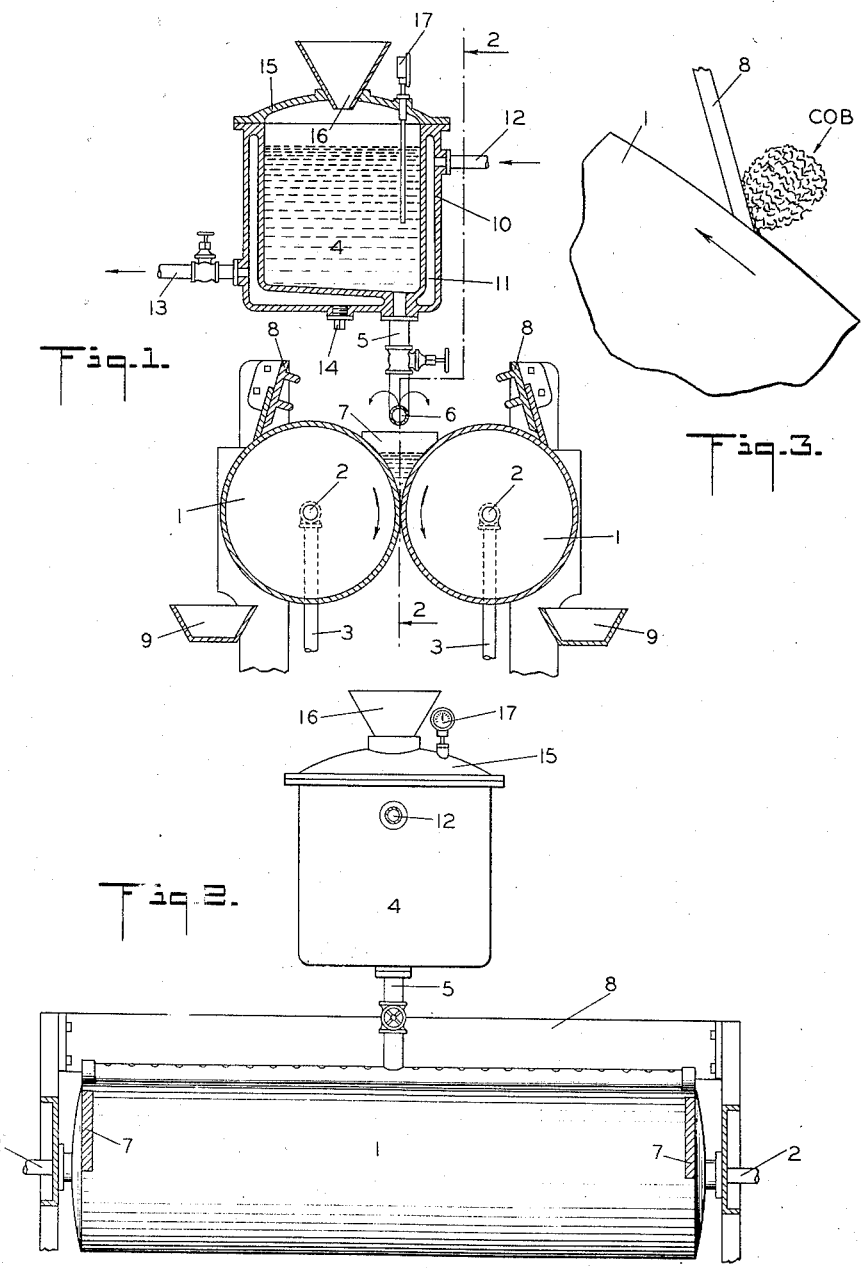
INVENTORS
GEORGE C. SUPPLEE
GEORGE E. FLANIGAN
BY
ATTORNEYS Patented Apr. 10, 1934

1,954,602

UNITED STATES PATENT OFFICE 1,954,602

PROCESS OF PRODUCING BETA LACTOSE

George C. Supplee and George E. Flanigan, Bainbridge, N. Y., assignors to The Dry Milk Company, Inc., New York, N. Y., a corporation of New York Application January 11, 1934, Serial No. 706,276

1 Claim. (Cl. 127—31)

This application is a continuation in part of our application Serial No. 414,880, filed December 18, 1929.

Our invention relates to the production of beta lactose with substantially no admixture of alpha lactose or at least only a very small admixture of such latter substance.

Lactose or milk sugar is known under two general forms—alpha lactose which is soluble in water with comparative difficulty, and beta lactose which is readily soluble in water. Alpha lactose in turn is known under two forms, the anhydrous and the hydrous, of which the latter is less readily soluble in water than the former.

If alpha lactose, whether in its hydrous or in its anhydrous form, is brought into solution, for instance, with water, a certain proportion of it will, within a longer or shorter period of time, depending on the temperature, be converted into beta lactose. When, with the solution at a given temperature, all the alpha lactose which, at such temperature, can be converted into beta lactose, has been so converted, the solution is said to be in equilibrium or balance. If the equilibrium solution of alpha and beta lactose is concentrated, either alpha lactose or beta lactose will precipitate in the form of crystals, primarily according to the temperature of the solution, although other factors affect the result. Below a certain temperature, which is usually but not necessarily in the neighborhood of 93° C., alpha lactose will tend to crystallize out, while above such temperature beta lactose will tend to crystallize out. This critical temperature is known as the transition point.

The proportion of alpha lactose and beta lactose in an equilibrium lactose solution will differ somewhat according to the temperature of the solution, but will at room temperature be somewhere in the neighborhood of 1.56 parts by weight of beta lactose to one part by weight of alpha lactose. If such solution be dried by rapidly evaporating the solvent in any well-known manner, for instance, while the solution is present in the form of a film on a heated roller drier of the type shown in patent to Just, No. 712,545 or in patent to Gere and Merrell, No. 631,568, there will be produced an amorphous product consisting of anhydrous alpha lactose and beta lactose substantially in the proportion in which these substances were present in the solution; or, if the drying operation is conducted so slowly that some of the beta lactose has time to crystallize out, but is carried to completion, the product would consist of a mixture of beta lactose crystals and a comparatively large proportion of alpha lactose and beta lactose present in the form of an amorphous powder, i. e. the alpha lactose would be present in the anhydrous form. The presence of any substantial proportion of anhydrous alpha lactose would be highly detrimental to the stability of the product, as such form readily absorbs moisture from the atmosphere, becoming converted into the hydrous form and resulting in a certain degree of caking.

We have found that we can produce beta lactose crystals in commercial quantities without substantial admixture of anhydrous alpha lactose by evaporating the solution rapidly in the form of a film on a heated surface at such a temperature and for such a length of time that the film, when removed from the surface, will contain sufficient water to permit beta lactose to separate from solution in the form of crystals, until almost all of the alpha lactose has been converted into beta lactose and the latter has separated in the form of crystals, before so much of the solvent has been driven off as to render crystal formation impossible, but not so much water that the heat remaining in the film is insufficient to remove substantially all of the water or to maintain the water above the transition point while crystallization is taking place or, in any event, at a sufficiently high temperature to enable a high proportion of beta lactose crystals to be obtained.

This process has the advantage over a drying process carried on in a vessel, that all of the lactose in the solution appears in the final product, but this contains only the very small amount of alpha lactose resulting from the drying of the final equilibrium solution, and such final product need not be washed (with consequent loss of material) to free the crystals from the mother liquor.

As we prefer to conduct the process, the material on the roll, just before removal from the surface, is a transparent syrup without any crystals visible to the naked eye, but it is possible to conduct the process so slowly that some of the beta lactose may crystallize out before the material is removed from the surface, leaving, however, sufficient moisture in the material, after removal from the surface, to permit conversion of most of the remaining alpha lactose, still present in solution, into beta lactose, and to insure against the presence of any but a negligible proportion of anhydrous alpha lactose in the final product.

The solution is most readily removed by a knife in the manner shown in the patents hereinabove referred to. We have found also that in an apparatus of the type shown in such patents an exposure of the solution, while in the form of a film, of somewhere between 5 and 15 seconds will give satisfactory results with the steam on the interior of the rolls at a gauge pressure of 75 to 83 pounds and the outer surface of the roll under the film, at the point of removal thereof by the knife, at a temperature in the neighborhood of 255°–260° F. (See "Measurement of surface temperatures" by Roeser & Mueller, Bureau of Standards Journal of Research, vol. 5, Oct. 1930, pp. 793, 801.) The film itself, under the specified conditions of steam pressure, would at its outer surface be at a temperature considerably above 212° F., i. e. at least at the temperature of its boiling point, whereas at its inner surface its temperature would approximate that of the surface of the roll. We do not, however, advise having the surface temperature of the heated cylinders, below the film, as high as 288° F. as such temperature appears to affect detrimentally the solubility and stability of the product. The amount of moisture which should be present in the material when it is removed from the surface should preferably be in the neighborhood of from 3 to 5% of the total weight of the said material, and if the process is conducted with reasonable care a product can be obtained which contains in excess of 98% of beta lactose.

In order to necessitate the evaporation of as little water as possible for a given amount of lactose to be treated, it is advisable to have the solution, prior to its being placed upon the evaporating surface, of as high a temperature as reasonably possible so that it may contain the highest feasible proportion of solute. By this we do not means that the solution should be as concentrated as possible because otherwise a large amount of beta lactose crystals would form while the solution is still on the roll, whereas we prefer (as securing more uniform production of a high percentage of beta lactose) to have at least a substantial proportion of such crystals, and preferably all of such crystals, form after the solution has been scraped from the roll.

Any one skilled in the drying art can produce our product by observing with reasonable care the following directions:

The lactose solution when applied to the drying apparatus should not be so dilute that under conditions of temperature and time of exposure on the roll the film, after removal from the roll, will not become substantially dry within a very short time by means of the retained heat. By "dry" we do not necessarily mean absolutely dry but dry enough so that the product, when packed, will be suitable for commercial uses.

The temperature of the heating medium within the roll or, in other words, the temperature of the surface of the roll, must be high enough so that the material upon removal contains no more water than can almost completely be removed by the heat retained in the material, but not so high as to leave too little moisture in the film to make crystallization impossible within the mass, or too much so as to cause the production of anhydrous alpha lactose.

The time of exposure may vary within wide limits but must not be so short or so long that under the given conditions of temperature too much or too little moisture is present in the film.

The proportion of moisture present in the film must not be so high that the film cannot be dried by the heat retained in the film and must not be so low as to prevent crystallization, and care must always be taken not to permit any but a negligible proportion of anhydrous alpha lactose to form. If the process is conducted with reasonable care, substantially no anhydrous alpha lactose will form.

While any suitable apparatus may be used for drying the solution in the form of a film, and for removing such film when the amount of water present therein has been diminished to the specified extent, the most practical apparatus known to us for such purpose is a roller drier of the type hereinabove referred to.

In the drawing accompanying the specification, Fig. 1 is a vertical cross-section of such an apparatus; Fig. 2 a vertical longitudinal section of such apparatus taken between the cylinders on the line 2—2 of Fig. 1; and Fig. 3 a cross-section of the material as it forms on the knife after removal from the roll. The numerals 1—1 indicate two almost contacting cylinders journalled in suitable supports by hollow journals 2—2 and rotated by any well-known means; pipes 3—3, connecting with said hollow journals, serve to introduce steam to the interior of the cylinders. The solution is delivered from the reservoir 4 through a pipe 5 to distributor 6 arranged above the cylinders, whence it flows between the cylinders 1—1, and dams or end pieces 7—7. Scrapers or knives 8—8 are provided to remove the film from the cylinders, and receptacles 9—9 are placed in position to receive the same.

The solution may be preheated by any suitable means. For instance, the reservoir 4 may be provided with a jacket 10 spaced from the walls thereof so as to define a space 11 into which steam or other suitable heating medium may be introduced through pipe 12. A valved pipe 13 is provided through which the heating medium may escape. The jacket may be provided with a drain plug 14. The cover 15 is provided with an opening and associated hopper 16 for introduction of solvent and lactose. A thermometer or temperature gauge 17 may be provided in the cover. Apparatus of the type shown in the drawing is well known in the milk drying art and is clearly illustrated in the United States Letters Patent hereinabove referred to.

In order to determine at what speed and at what temperature the process should be conducted, the simplest method is to place the solution between the rolls and then to vary the speed or the degree of steam pressure, or both, until the desired result is obtained, namely that the material, which when scraped off is still moist, will dry almost instantaneously and form the desired product.

The product is preferably pulverized and bolted to the desired degree of fineness before packing into commercial containers.

The following examples will illustrate our invention. The products referred to therein were all obtained by applying the solution having a temperature of 180° F., to a drying apparatus of the type described, each of whose two cylinders was 28 inches in diameter and was filled with steam at a gauge pressure of 80 pounds. The products of all of the examples were completely and substantially instantly soluble, as for example, complete solution will result after 2 minutes (with agitation) at a 31% concentration in water at 75° F. when tested 8 hours after manufacture; also after 7 days' storage under ordinary atmospheric conditions and also thereafter after 7 days' storage in a control humidity chamber having an atmosphere of 50% relative humidity.

The samples were all ground in a mortar within eight hours after removal from the roll.

The products of all of the examples, except Example 4, were decidedly "wet" when removed from the rolls by the knife. The moisture content of the products of the first three examples was well above 3% as they were removed, and the products had the characteristics of a very viscous molasses at the instant of removal and constituted a rollable paste. Therefore the products could not drop immediately from the knife but coiled up into the form of a cob as illustrated, on full size scale, in Fig. 3, until the aggregate was heavy enough to drop from the knife into the receptacle 9. However, the heat within the removed material was sufficient to result in a substantial drying thereof as it formed itself into the cob, so that the interior of the cob was already hardened before such cob dropped off, only the exterior being still substantially moist. The product of Example 4 came off in the form of chips, thus showing that the material had been dried to a degree higher than that corresponding to our preferred method, and as a result some alpha anhydrid was present in the product. Nevertheless the percentage of alpha anhydrid was not so great as to make the product commercially undesirable.

Example 1

A 27% solution of lactose was exposed on the cylinders for 9.41 seconds and was a transparent syrup free from visible crystals at the instant just before contact with the knife. 8 hours after manufacture the product had, and thereafter continued to have, a free moisture content of about .18%. It contained, if any, such a negligible proportion of alpha lactose that for all practical purposes the product consisted of 100% beta lactose.

Example 2

A 38% solution of lactose was exposed on the cylinders for 9.41 seconds and just before being removed by the knife was a transparent syrup with minute crystals already visible. The product contained .09% free moisture 8 hours after manufacture and did not vary over .03% thereafter. The product contained 99% beta lactose.

Example 3

A 53% solution of lactose was exposed on the cylinders for 7.53 seconds. The solution was a transparent syrup apparently free from crystals just before removal. The product contained .02% of free moisture 8 hours after manufacture and did not show above .09% of free moisture during subsequent handling under ordinary atmospheric conditions, or after storage for 7 days in a control humidity chamber having an atmosphere of 50% relative humidity. The product contained 99% beta lactose.

Example 4

A 27% solution was exposed on the cylinder for 14.51 seconds and just before removal by the knife showed an appreciable degree of crystallization and came off in the form of chips. The free moisture content 8 hours after manufacture was .17%, 7 days after manufacture was .16%, and thereafter, and after storage for 7 days in a control humidity chamber having an atmosphere of 50% relative humidity, .1%, and the product contained 98.5% beta lactose.

Similar results have been obtained by us with other concentrations of solution within the limits hereinabove given, namely 27% and 53%, and with varying times of exposure. The free moisture content of all of the products at all times was less than .2% and did not vary over a few hundredths of 1% during the handling and storage periods, thus indicating that all of the products had a high degree of stability.

As the products of the first three examples were all produced from solution and were not deprived of too much moisture on the rolls, substantially all of the alpha lactose present was in the stable, i. e. hydrous, form. The product of Example 4, while containing alpha anhydrid, contained only a small proportion of total alpha lactose (both hydrous and anhydrous) as the material had not been deprived of so much moisture, while on the rolls, as to prevent almost complete conversion of alpha lactose to beta lactose after removal from the rolls.

In Example 2, where we started with a more concentrated solution then in Example 1, less water was present in the film and therefore with the same period of exposure and the same degree of heat there was undoubtedly less moisture present in the final film and therefore less opportunity given for such alpha lactose as was present therein to be converted into beta lactose. In the product of Example 2 therefore there was apparently present as high as 1% of hydrous alpha lactose instead of the negligible proportion of hydrous alpha lactose in the product of Example 1.

In Example 3 we used a more concentrated solution than in Example 2 but exposed the film for a shorter period of time. There was apparently about as much moisture left in the final film as in Example 2 and we therefore obtained a product substantially the same as that of Example 2.

In Example 4 we started with the same strength of solution as in Example 1 but exposed the product for almost twice as long a time as in Example 1, and there was apparently too little moisture left in the film (which came off in chip form, i. e. drier than the cob form) before all of the alpha lactose in solution had been converted into beta lactose, and we therefore obtained in the product apparently 1½% of alpha lactose, some of which was alpha anhydrid. This example illustrates a departure from the optimum conditions of operation.

The products of all of the examples, however, had the same solublity and were practically of equal stability. We cannot at this time explain why the products of Examples 2, 3 and 4 should be as readily soluble as the product of Example 1, which is almost 100% beta lactose.

While we have hereinabove stated that in the preferred method of carrying out our invention the moisture content of the material, as it leaves the rolls, i. e. at the instant the knife lifts the material from the rolls, should be from 3 to 5%, a lower percentage of moisture may be left within the material, not substantially less than 2%, and result in a marketable product. We have, therefore, in our claim, in order to distinguish our method from any method of substantially completely drying the material on the rolls, specified that such moisture content should be at least 2%, but it should of course be understood that a slight lowering of such moisture content, resulting nevertheless in a product sufficiently stable for commercial purpose, and having a high beta lactose content would be within the spirit of our invention and therefore within the ambit of our claim.

It will, of course, be obvious that by completing the drying of the material after removal from the roll, and with the aid of the heat accumulated within the material while on the roll, there will be effected a saving not only of heat units but of time; therefore, other things being equal, our process can be conducted in a shorter time calculated with respect to a pound of material, and with a substantial saving of heat units. Moreover, it would appear that by providing for the presence of a substantial amount of free moisture within the material as it is being removed from the rolls, the formation of a substantial proportion of alpha anhydrid, at least sufficient to cause caking during storage, can be insured against.

We claim:

The process of producing beta lactose which comprises drying a solution of lactose rapidly in the form of a film on a heated surface at such a temperature considerably above 212° F. and for such a length of time that the film will, at the time of removal from the surface, be substantially in the form of a rollable paste and contain enough water, not substantially less than 2%, to permit beta lactose to separate from the removed material in the form of crystals, but not so much water that the heat remaining in the film is insufficient to dry the film, and will contain enough heat to evaporate such water, but not so much heat as to prevent crystal production of beta lactose or cause the production of a substantial proportion of anhydrous alpha lactose, and then removing the film from the surface.

GEORGE C. SUPPLEE.
GEORGE E. FLANIGAN.